July 16, 1968  G. J. MORRIS  3,392,596
JOY STICK TYPE MULTI-OPERATION CONTROL DEVICE
Filed May 2, 1966  3 Sheets-Sheet 1

GREGORY J. MORRIS
INVENTOR.

BY *Frank C. Parker*

ATTORNEY

July 16, 1968  G. J. MORRIS  3,392,596
JOY STICK TYPE MULTI-OPERATION CONTROL DEVICE
Filed May 2, 1966  3 Sheets-Sheet 2

GREGORY J. MORRIS
INVENTOR.

BY *Frank C. Parker*

ATTORNEY

July 16, 1968  G. J. MORRIS  3,392,596
JOY STICK TYPE MULTI-OPERATION CONTROL DEVICE
Filed May 2, 1966  3 Sheets-Sheet 3

GREGORY J. MORRIS
INVENTOR.

BY *Frank C. Parker*

ATTORNEY

United States Patent Office 3,392,596
Patented July 16, 1968

3,392,596
JOY STICK TYPE MULTI-OPERATION CONTROL DEVICE
Gregory J. Morris, Rochester, N.Y., assignor to Bausch & Lomb Incorporated, Rochester, N.Y., a corporation of New York
Filed May 2, 1966, Ser. No. 546,999
3 Claims. (Cl. 74—471)

ABSTRACT OF THE DISCLOSURE

A joy stick type of control mechanism intended to perform a multiplicity of mechanical operations simultaneously or in sequence and being convertible easily to other sequences and timing.

---

The present invention relates to a joy stick type of control device for multiple operations which are performed concomitantly in various combinations and more particularly it relates to improvements in the mechanical structures thereof.

So-called joy stick control devices of many kinds are used for a considerable variety of coordinated actions in the prior art such as hot and cold mixing valves, universal motions for mirrors, flight control, sequential hydraulic valves as well as coordinated electrical switching controls. Each of the different kinds of joy stick type of control devices presents a different development problem in some degree, and because of the great increase in the use of servomechanisms and complex mechanisms, there is an increased need for continued development of the joy stick type of control to improve versatility of uses as well as compactness and dependability.

In view of such needs, it is an object of the present invention to provide a joy stick type of control device which is so constructed as to provide great versatility of use and improved reliability and sturdiness of construction for every condition of use.

It is a further object to provide such a device which may be easily converted from a timed relationship between operations of a given kind to another timed relationship between operations of a different kind.

Another object of the present invention is to provide such a device which may be constructed and serviced at a minimum of expense and is comparatively small in overall dimensions although the alignment mechanism of its parts is strongly formed to maintain excellent operation characteristics under strong vibration conditions of use.

It is a still further object of the present invention to provide such a device wherein the joy stick may be operated in any direction through an arc of at least 70° and still return after each deflection to the true neutral position within ±.5° while requiring no more than 4 oz. of force at any time.

Further objects and advantages will be apparent in the combination and arrangements of the constituent parts and in the details of construction thereof by reference to the following specification taken in connection with the accompanying drawings, wherein.

Figure 1:
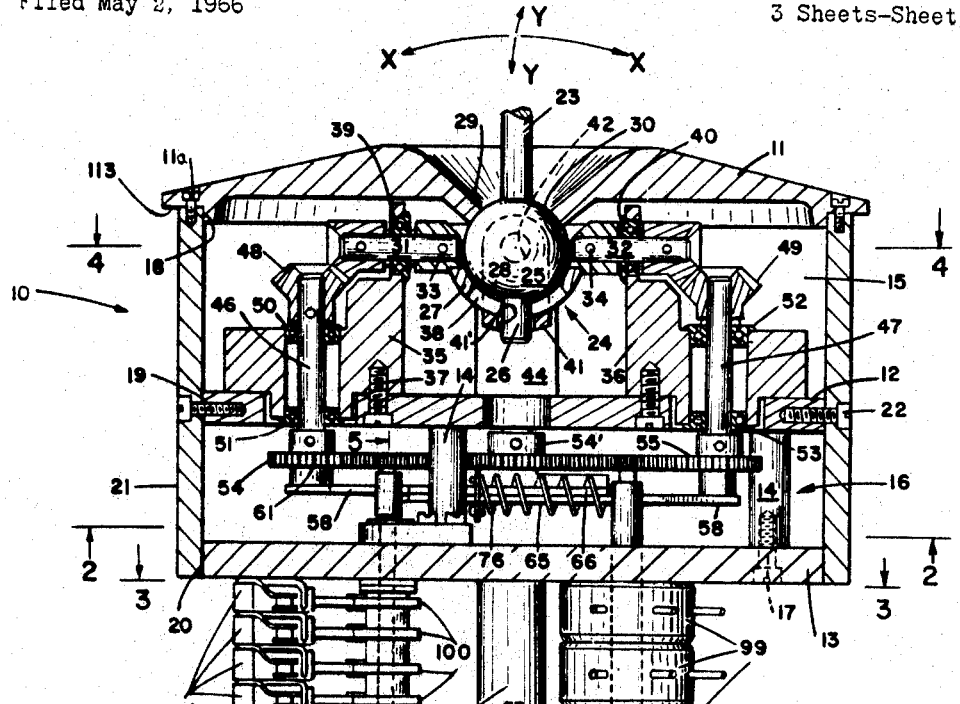
FIG. 1 is a generally midsectional view of one form of the present invention.

The joy stick control device of the present invention is generally designated in the drawings by the numeral 10 and is characterized by a multi-decked modular construction whereby mechanism having one function may be grouped in one compartment adjacent to other contiguous compartments which comprise mechanism having other distinctive functions, each compartment being operatively connected to the other compartments to collectively produce a coordinated end result. In the illustrated form of the invention, said device comprises a modular framework having a top or cover plate 11 to which is secured in spaced relation therebelow an intermediate deck plate 12 preferably having a circular shape. Spaced parallel therebelow is a lower or second deck plate 13 which is similar in shape to the first deck plate, the decks being spaced apart by a plurality of interdeck struts 14 so as to form a first and a second compartment 15 and 16.

The interdeck struts 14 are suitably securely anchored to their respective deck plates 12 and 13 by any desired means such as the screws 17 and/or by press fitting the ends thereof in accommodating bores formed in the adjacent plates.

In accordance with the objects of the present invention, the deck plates 12 and 13 are held in sturdy and reliable coaxial alignment with the top plate 11 as described additionally herebelow so that a complete self-rigid operating unit is thereby provided. Each plate 11, 12 and 13 is provided with a smooth outer diameter 18, 19 and 20, respectively, and is slidably fitted within a stationary elongated cylindrical casing 21 by which the device 10 is united and enclosed. For locking the operating unit 10 within the casing 21, one or more screws 22 extend radially through the casing and are threaded into the edge of one or more of said plates 11 to 13. Top plate 11 is held on the edge of the casing 21 by the cap screws 11a.

Each compartment 15 or 16 is adapted to contain mechanism which serves a distinctive function and the end result is obtained by the interconnection and combination of all of the associated mechanisms as set forth herebelow. It is intended that the mechanism in each compartment 15 or 16 may be assembled and tested as well as serviced by itself substantially without disturbing the adjacent compartments as will be readily apparent from the drawings and the description thereof.

Comprised in the above-mentioned combination is a so-called joy stick or actuating lever 23 which is mounted for universal motion by a double-yoke pivoting mechanism 24. Said universal pivoting mechanism 24 includes a ball 25 which is fixed onto and near the lower end of the joy stick 23 and constitutes a part of a ball and socket joint. The lower end of the joy stick 23 projects a short distance below the ball 25 to effectively form a connecting lug 26 thereon for actuating the yokes to be described. For supporting the ball 25, a first or inner yoke 27 is provided having a smooth curved inner seating surface 28 whereon the ball rests and moves pivotally about its center whereon the surface 28 is centered.

Centrally on the lower side of the top plate 11 is formed an annular ridge or flange 29 which projects obliquely downwardly at a steep angle around a central tapered opening 30 through which the joy stick 23 projects. The purpose of said flange 29 is to bear against the upper surface of the ball 25 and retain the ball against the curved surface 28 and it thus provides the upper part of said socket. The yoke 27 is pivotally hung on a pair of short coaxial rocker shafts 31 and 32 which are fitted into aligned bores formed in opposite sides of the yoke, said shafts being anchored in said bores by any suitable means such as the lock pins 33 and 34 to transmit power.

The yoke rocker shafts 31 and 32 in turn are rotatably journaled in a pair of stationary bearing blocks or stands 35 and 36 which rest on the deck plate 12 and are fixed thereto by any reliable means such as a plurality of screws 37 which extend through holes in said plate and are threaded into said blocks. Longitudinally through the arcuate midsection of the yoke 27 is formed an elongated slot 38 through which the lug 26 projects and wherein the lug is slidably fitted so that the joy stick 23 may swing yoke 27 in a plane normal to the plane of the drawing in the direction of the Y—Y axis. As shown in FIG. 1, the shaft is actually journaled on frictionless bearings 39 and 40 which are held in any preferred manner in accommodating bores in the bearing blocks 35 and 36.

Figure 4:
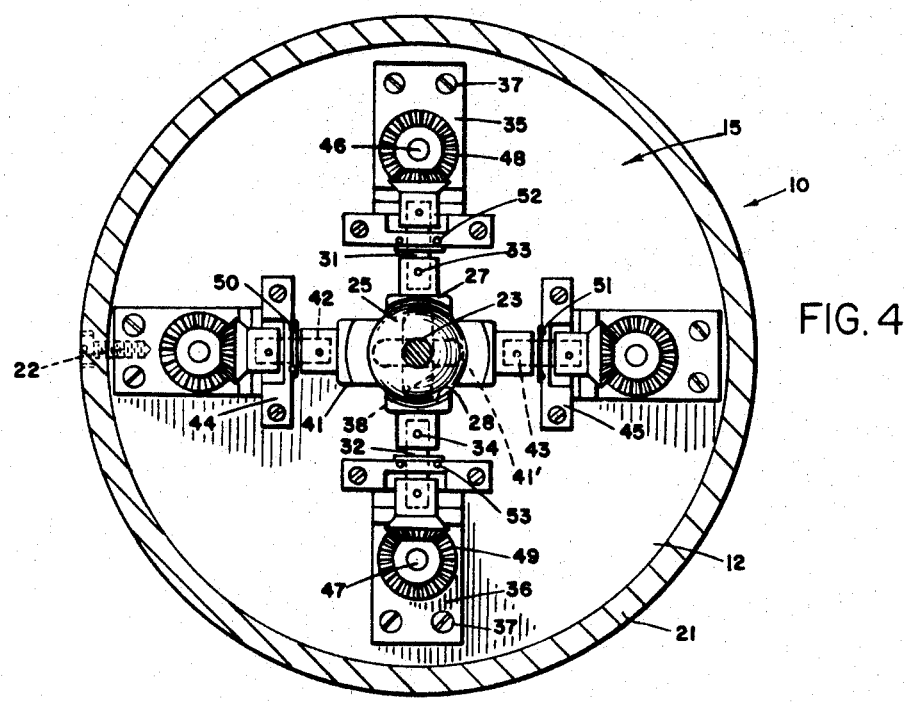
FIG. 4 is a sectional view of the mechanism taken on line 4—4 of FIG. 1.
Figure 3:
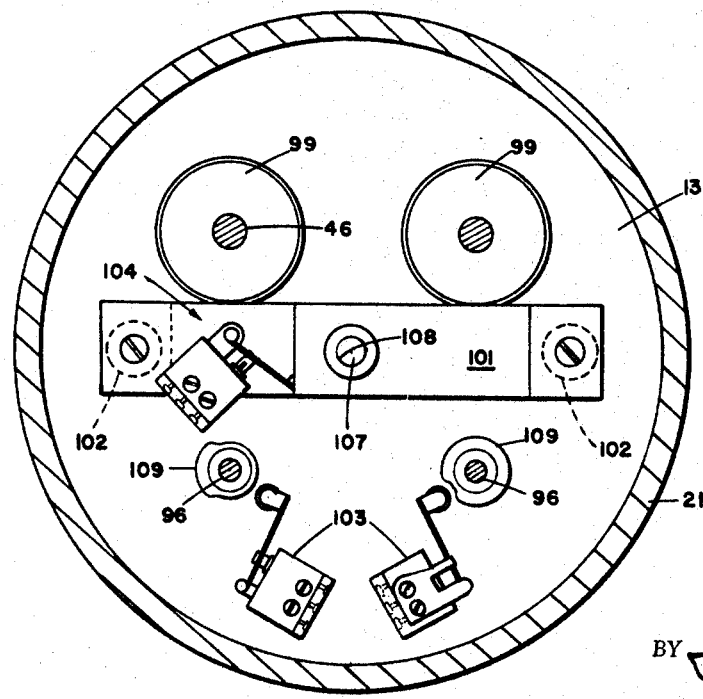
FIG. 3 is a partial bottom view of the operating unit, parts thereof being broken away for illustration purposes.

A second or outer yoke 41 is provided extending across the outer surface of inner yoke 27 and being similarly constructed for pivotal motion thereabout in the plane of the drawing along the X—X axis. Such motion is effected by pivoting yoke 41 at its opposite ends on a pair of short coaxial rocker shafts 42 and 43 which extend at right angles to the pair of shafts 31 and 32, the geometrical axes of all of said shafts extending through the center of the ball 25. Shafts 42 and 43 are journaled similarly to shafts 31 and 32 in ball bearings which are seated in suitable counterbores which in turn are formed respectively in a pair of bearing blocks 44 and 45, see FIG. 4. To permit the outer yoke 41 to swing in an arc on its shafts 42 and 43 around the inner yoke 27, an elongated slot 41' is formed along the middle arcuate portion thereof and it is slidably fitted to the outer end of the lug 26 whereby the lug causes motion of one or both of the yokes 41 and 27 upon movement of the joy stick 23.

Referring still to FIG. 1 of the drawings, the shafts 31 and 32 are rotatably connected to a pair of vertical shafts 46 and 47 respectively by bevel or miter gearing 48 and 49 respectively. Said vertical shafts 46 and 47 are rotatably mounted by suitable anti-friction bearings 50, 51 and 52, 53 which are held in the bearing blocks 35 and 36 respectively. Shafts 46 and 47 project through clearance holes in the lower intermediate deck plate 12, and on the end of said shafts are fixed in any suitable manner the spur gears 54 and 55 respectively.

Figure 2:
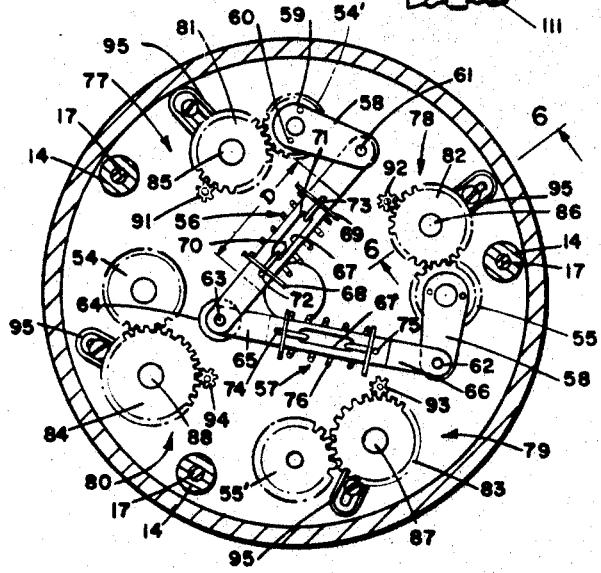
FIG. 2 is a sectional view taken on the line 2—2 of FIG. 1.

In the present invention an extremely reliable neutral position mechanism is provided for the joy stick 23 whereby the neutral position thereof is always assured within a close tolerance of ±.5°. With reference to FIG. 2 of the drawing, two duplicate neutral position devices 56 and 57 are provided, each comprising a plate 58 which is secured at one end by any desired means such as two screws 59 and 60 to the lower surfaces of the spur gears 54 and 55 respectively. The outer end of each plate 58 constitutes a lever arm having a predetermined effective radius of a length which is found advantageous in holding the gear 54 in neutral angular position.

The neutral position devices 56 and 57 are characterized by a linkage mechanism having the same effective length between their lever pivot points 61 and 62 and a common fixed pivot 63 formed on a single anchor post 64. Each linkage mechanism is composed of two flat sided links 65 and 66 which overlap each other for a considerable distance D as shown in FIG. 2. Duplicate superimposed open elongated slots, one of which is shown at 67, are formed in the flat links 65, 66. The links are held together by a pair of disks 68, 69 which fit loosely thereover to permit relative longitudinal sliding motion therebetween. The opposite ends 70, 71 of slots 67 are held in good registry with each other by a pair of V-shaped hook-like retainers 72, 73 which straddle or reach across the edges of the flat links 65, 66 and bear against the slot ends 70, 71. Means for applying pressures in opposite directions against the retainers 72, 73 at the opposite ends of the slots 67 is provided by forming upturned ears 74, 75 on both sides of retainers 72 and 73 at each side of the portion which extends across the slot ends 70, 71 so as to engage against the outer surfaces of said disks 68 whereby the disks are normally longitudinally located. Also provided is an expansion spring 76 which is seated at its ends against the inner surfaces of said disks 68, 69 to force the retainers simultaneously away from each other so that the center portion thereof rests against the ends 70, 71 of said slots.

In operation of the neutral positioning mechanism, rotation of the gears 54 and 55 and consequently the plate-like arms 58 in either direction causes the linkage mechanism to either shorten or lengthen depending on the direction of rotation, and in either case the ends 70, 71 of the elongated slots 67 are moved out of registry with each other and the retainers 72, 73 are moved towards each other while the spring 76 is consequently compressed. Since the spring is always under initial compression there is always a positive restorative force available at neutral position of the neutralizing mechanism and reliable positioning of the device in neutral position repetitiously with accuracy is possible within no more than ±.5° of pivotal motion of the joy stick 23.

As shown in FIG. 1, the second or lower compartment 16 is located between the deck plates 12 and 13, the plate 13 being considered to be the base of said compartment 16. Compartment 16 contains the mounting mechanism for a plurality of changeable-ratio gear trains which are generally designated by the numerals 77, 78, 79 and 80, FIG. 2. Said changeable-ratio gear trains provide for a restriction or amplification of the angular movement of the driven gears 91, 92 and for their corresponding gears 93 and 94. The arrangement of the gear trains 77 to 80 is best shown in FIG. 2 wherein said drive gears 54, 54', 55 and 55' mesh with the idler gears 81, 82, 83 and 84 respectively which are journaled on vertical idler shafts 85, 86, 87 and 88 respectively. Shafts 85–88 in turn are fixed in movable support members, one of which is shown at 89 in FIG. 6, anchored by a plurality of screws 90 to the underside of the upper deck plate 12. In order to provide an adjustable support for said gears 81–84, such that gears 91–94 of different pitch diameters may be accommodated, a slotted bracket 95 is provided integrally with the support members 89.

Figure 6:
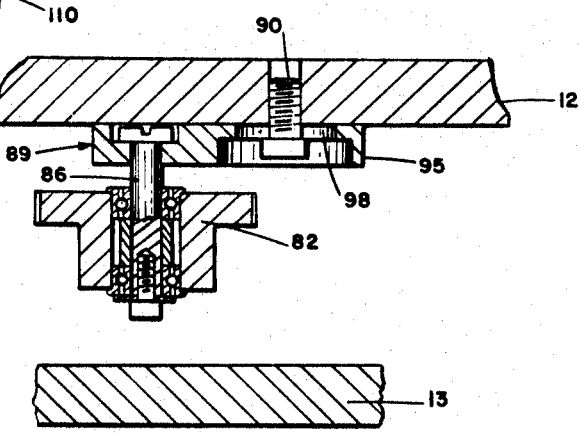
FIG. 6 is a sectional view taken on line 6—6 of FIG. 2.

As seen in FIG. 6, bracket 95 is secured for lateral adjustment to deck plate 12 by cap screws 90 which extend through an elongated slot 98 and are threaded into plate 12 whereby changes of position of the support 89 are possible to accommodate for changes in pitch diameter of gears 91–94 or gears 54–55.

Figure 5:
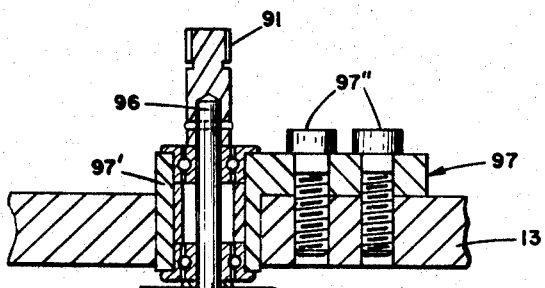
FIG. 5 is a sectional view of the complete device, parts thereof being broken away and shown fragmentarily for the sake of clarity.

As aforesaid, a plurality of fixed position driven gears 91, 92, 93 and 94, FIG. 2, are provided having meshing engagement with the idler gears 81–84, the number of teeth on gears 91–94 in said gear trains 77 to 80 being chosen to achieve the desired gear ratio with the drive gears 54, 54', 55 and 55' so as to best serve the particular device to which the gears are connected. This mechanism is shown in FIG. 5 which is a vertical section taken on line 5—5 of FIG. 1. One of the driven gears 91–94 is formed on one of said driven shafts as shown individually at 96 in FIG. 5.

Transmission or cam shafts 96 are extended a considerable distance below plate 13 so that a plurality of electrical devices, such for instance as the potentiometers 99 or switch operating cams 100 which actuate switches 100', may be ganged together in tandem relationship so as to operate in timed relationship to each other.

In order to mount the shaft 96 rotatably in the plate 13, an intermediate independent bearing member 97 is provided wherein suitable anti-friction bearings are secured to contact with both the member 97 and shaft 96. Said bearings are held in an elongated boss portion 97' of the member 97, the exterior surface of said portion being slidably fitted into a corresponding opening in the deck plate 13 and being held therein by a plurality of cap screws 97″. Such a construction facilitates the easy and quick disassembly of the bearing member 97 whenever it is necessary to change the gear 91.

Below the deck plate 13, it is contemplated to add other decks as needed having variously modified profile shapes, one of which may be in the form of a bar 101. Said bar is mounted like the deck 13 by a plurality of interdeck posts 102, as shown in FIG. 1, which are securely fixed at top and bottom ends to and between the deck 13 and bar 101 respectively in a manner similar to the posts or struts 14.

One advantage of a narrow deck or bar 101 is that the tandem construction is facilitated, i.e., as aforesaid, the potentiometers 99 and switch operating cams 100 may be stacked so that the individual potentiometers and cams may be relatively adjusted angularly of each other to achieve any desired sequence or concert of actuation between the potentiometers 99 and switches 100′.

Another feature possessed by the joy stick control device is the actuation of a separate group of switches 103 by rotation of the casing 21 only and may take place if desired simultaneously with movements of the joy stick 23. The mechanism by which this action is produced comprises a bracket 104 which is fixed in any desired manner such as the cap screws 105 onto the cross bar or deck 101. The lowest part of the bracket 104 forms a shelf which extends across the axis of rotation of the control device 10 and serves as a bearing support 106 for a vertical cam shaft 107 journaled therein. At the upper end thereof as shown in FIG. 7, the cam shaft 107 is journaled in a suitable bearing surface 108 of any preferred construction formed in plate 13 and several cams 109 are fixed thereon.

Figure 7:
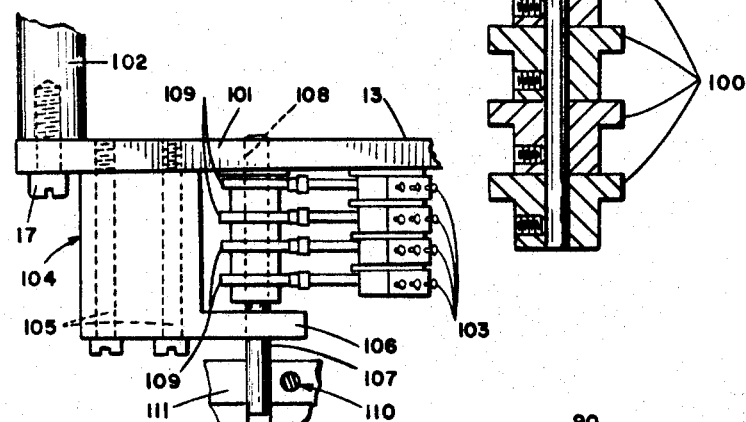
FIG. 7 is a side elevation of the lower portion of the device shown in FIG. 1, parts thereof being broken away and shown in section.

The cam shaft 107 extends considerably below the bearing support 106 and is releasably clamped securely by a suitable clamp mechanism 110 in a stationary block or collar 111 so that rotation of the joy stick device 10 in either direction causes relative movement between the cam shaft 107 and mounting deck 101 as shown in FIG. 7. Secured in any preferred maner in depending position below and onto the bar 101 is the aforesaid plurality or gang of switches 103 which are actuated as indicated in FIG. 7 by the cams 109. It should be understood that the relative angular positions of said switch cams 109 may be adjusted in the same manner as cams 100 to provide variation in the sequence of operations controlled thereby.

In preparation for operating the control device 10, a suitable stationary support member, not shown, having a cylindrical opening therein is provided, said opening being slidably fitted to receive the outside diameter of the casing 21. With all of the control wires (not shown) connected to said potentiometers 99 and switches 100′, the control device 10 is lowered into the aforesaid opening until the undersurface of the rim portion 113 rests against said support member. After the cam shaft 107 is seated in the bearing surface 108, the clamp 110 is secured to the shaft. Thereafter, deflection of the joy stick 23 in the direction of the Y—Y axis, for instance, would swing the inner yoke 27, rotate shafts 31 and 32, and consequently vertical shafts 46 and 47 whereupon all of the switch cams 109 and potentiometers 99 which are connected to one pair of vertical shafts are actuated simultaneously or nearly so, dependent on the individual angular adjustments thereof.

Deflection of the joy stick 23 along the X—X axis causes the outer yoke 41 to swing thus rotating the shafts 42, 43 and consequently rotates the vertical shafts connected thereto by way of miter gearing 49 to actuate the remaining switches and potentiometers.

As mentioned in the objects of this invention, the versatility of uses of the control device 10 is greatly enhanced by the particular structures described above which are all combined in compact manner to conserve space in situations where open space is hard to find in a complex array of mechanism. The rotation rate and relative angular timing of the actuating shafts is not only variable as described above but other operating units may be substituted for the switches 103 and various other changes may be made in the form, arrangement, and details of construction without departing from the spirit of the invention as set forth in the claims herebelow.

I claim:

1. A joy stick type of multi-operation control device for concomitantly controlling at least two different operations, said device having in combination a control stick and a ball formed thereon near the lower end thereof, socket means including an inner arcuate yoke and a curved seating surface which is formed to slidably receive and support said ball, a first pair of horizontal coaxial power transmitting shafts which are fixed coaxially of each other in the opposite ends of said yoke, an outer arcuate yoke positioned crosswise to said inner yoke, a second pair of coaxial power transmitting shafts which are fixed coaxially of each other through the opposite ends of said outer yoke, the axes of all of said shafts being substantially coplanar and the outer yoke being larger than the inner yoke so that one swings about the other, a first deck plate whereon said yokes are carried, a pair of bearing stands which are fixed uprightly on said plate on opposite sides of said inner yoke, each stand having one of said shafts rotatably journaled therein, a top cover plate extending parallel to and spaced from the first deck plate, an annular inclined bearing surface formed on the underside of said top plate and extending into contact with the upper side of said ball so as to complete said socket, said inclined bearing surface being formed around a large tapered clearance opening through which the joy stick projects, spacer means operatively constructed on and between said top plate and said first deck plate for securing one plate in parallel spaced relation to the other, a pair of vertical shafts rotatably journaled in said pair of bearing stands respectively and projecting through and below said first deck plate, a gearing connection between each horizontal shaft and each vertical shaft for rotating the latter shafts in response to movements of said joy stick, an upstanding stationary pivot post fixed to the underside of said first deck plate at a position which is about equidistant from each of said vertical shafts, a pair of substantially equal crank arms which are fixed individually to and project radially from the lower ends of two of said vertical shafts which are connected to different yokes, a pair of variable length connecting linkages having a constant normal length, said linkages normally lying in a direction substantially normal to the axis of said arms, said linkages being both pivotally secured at one end on said post and being individually secured at their opposite ends respectively on the outer ends of said cranks, a yieldable member and means operatively constructed on each of said linkages for mounting said member thereon so as to change its neutral length under stress whenever said crank arms are angularly moved whereby said joy stick is maintained very closely in a prescribed neutral position.

2. A joy stick type of multi-operation control device for concomitantly controlling at least two different operations, said device comprising a joy stick type control member, a framework including a first deck plate whereon said member is held for universal motion, two pairs of vertical shafts which extend through said deck plate and means on said plate for rotatably journaling the shafts operatively on said plate, means operatively constructed on and between said member and shafts whereby the shafts may be rotated by the member, a crank arm fixed radially to the lower end of one of each pair of shafts below said deck plate, an upstanding pivot post fixed to said plate in a position about equidistant from said shafts, a variable length linkage connecting the outer end of said arm and said post, said linkage including a pair of contiguous aligned flat bars which overlap at their inner ends and are pivotally anchored at their outer ends to the end portion of said arm and to said post respectively, a pair of superposed abutment surfaces formed in the overlapping portions of said bars in the opposite ends of a pair of substantially duplicate longitudinal slots, a U-shaped abutment member having a bottom portion shaped to contact said abutment surfaces when said bars are in neutral position, said abutment member having integral side portions formed thereon which loosely hold said bars together and extend longitudinally away from said surfaces, each of said side portions having a terminal lateral projecting portion formed thereon, a washer fitted over and loosely enclosing said bars and one of said abutment members and resting against the inner side of said lateral portions at each end of said slot, and a compression spring surrounding said bars and seated under stress at its ends between the abutment members at the opposite ends of said slots, whereby the linkage will be always returned to neutral length after temporary change of length so that said joy stick control member will always return to exact neutral position within very close limits.

3. A joy stick type of control device for concomitantly controlling a plurality of different operations, said device having in combination, a control stick and a ball formed thereon near the lower end thereof, a top cover plate having a clearance opening through which said control stick projects, a first deck plate which is fixed substantially parallel to the cover plate, an inner arcuate yoke operably mounted for swinging motion about a first axis which is parallel to said deck plate, an outer arcuate yoke operably mounted for swinging motion about a second axis which is parallel to said deck plate and extends normal to said first axis, universal motion bearing means cooperatively formed fixedly on the arcuate parts of said yokes and on the adjacent part of said cover plate constituting captive seating means for said ball, spacer means operatively constructed on and between said top plate and said first deck plate for securing one to the other in parallel relation, a pair of motion transmitting shafts operatively journaled parallel to each other in said deck plate and extending therebelow, said shafts being operably connected to rotate in response to the swinging motion of said yokes, a drive gear releasably secured on the lower end of each said shafts, a lower deck plate fixed to said first deck plate in parallel spaced relation thereto, a second pair of transmission shafts journaled in said lower deck plate in fixed spaced relation to the first transmission shafts and operatively connected to be moved individually by different said yokes, a driven gear releasably secured on the upper end of each of the second pair of shafts in a plane common to said drive gears, whereby gears of both the drive and driven gears may be interchanged with other gears to change the ratio therebetween, an idler gear engaged in driving relation between each drive gear and its corresponding driven gear, an idler gear shaft whereon the idler gear is mounted, a support bracket wherein said idler gear shaft is journaled, and means operatively constructed on said lower plate and bracket for securing said idler gear for transverse adjusting motion parallel to the plane of the gears so that either the drive gear or driven gear may be changed to alter the gearing ratio.

References Cited

UNITED STATES PATENTS

| | | | |
|---|---|---|---|
| 2,610,520 | 9/1952 | Snow | 74—471 |
| 2,762,234 | 9/1956 | Dodd | 74—471 |

FRED C. MATTERN, Jr., *Primary Examiner.*

B. T. CALLAHAN, *Assistant Examiner.*